J. M. & G. M. OVERSHINER
Hog-Traps.

No. 151,048. Patented May 19, 1874.

WITNESSES:
E. Wolff.

INVENTOR:
J. M. Overshiner
G. M. Overshiner
BY
ATTORNEYS.

UNITED STATES PATENT OFFICE.

JAMES M. OVERSHINER AND GEORGE M. OVERSHINER, OF ELWOOD, INDIANA.

IMPROVEMENT IN HOG-TRAPS.

Specification forming part of Letters Patent No. 151,048, dated May 19, 1874; application filed March 14, 1874.

*To all whom it may concern:*

Figure 1:
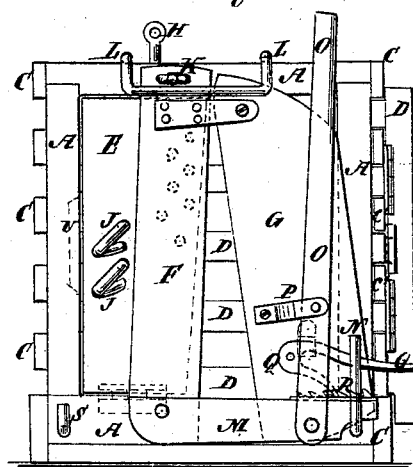
Figure 2:
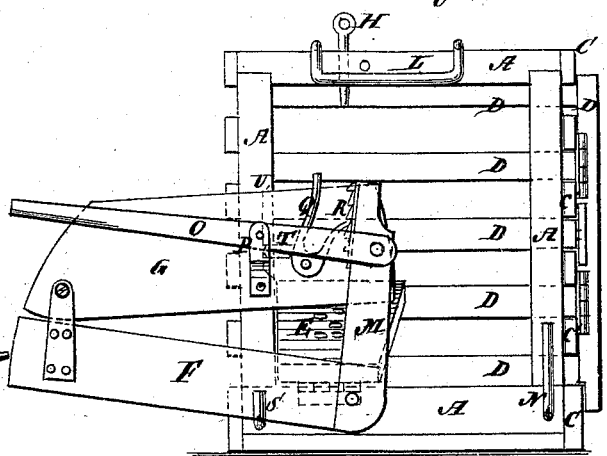
Figure 3:
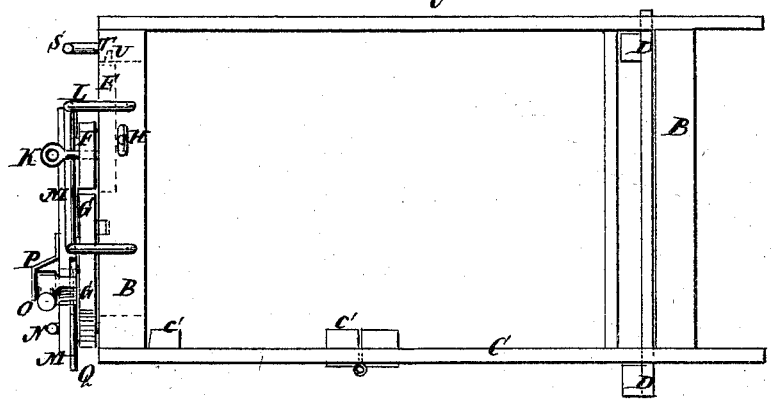
Figure 4:
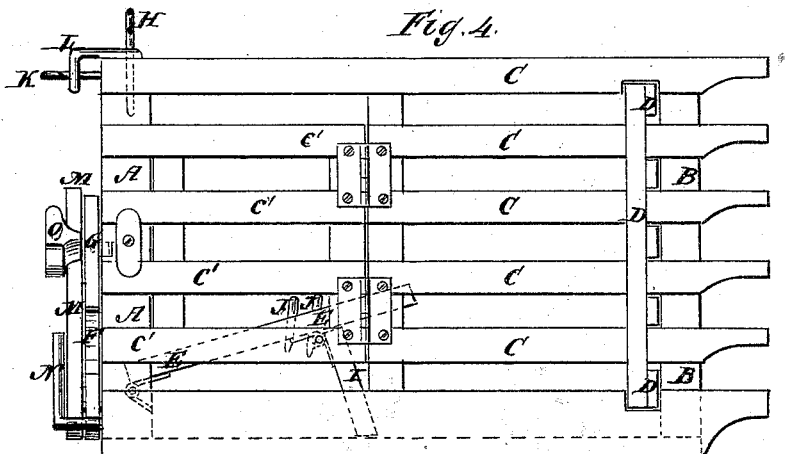

Be it known that we, JAMES M. OVERSHINER and GEORGE M. OVERSHINER, of Elwood, in the county of Madison and State of Indiana, have invented a new and useful Improvement in Hog-Trap, of which the following is a specification:

Figure 1 is a front view of our improved trap, showing the parts in position for holding the hog while ringing, marking, and castrating him. Fig. 2 is a front view of the same, showing the parts in position for holding the hog while spaying her. Fig. 3 is a top view of the same, the parts being in the position shown in Fig. 1. Fig. 4 is a side view of the same, the parts being in the position as shown in Fig. 2.

Similar letters of reference indicate corresponding parts.

Our invention has for its object to furnish an improved trap for catching and holding hogs while ringing, marking, castrating, and spaying them, and which shall be simple in construction, convenient in use, and reliable in operation, holding the hog securely and firmly. The invention relates to an arrangement of levers for catching, holding, and throwing or turning the hog, and a table for supporting and securing it, as hereinafter described.

A and B are the end frames of the trap, each of which consists of two posts, connected at their upper and lower ends by cross-beams. The sides of the trap are formed by attaching long bars or slats C to the outer sides of the posts of the end frames A B. Upon one side a part of the bars C are cut away and replaced by a small door or grate, c', to enable the operator to enter and to leave the trap conveniently. The rear end of the trap is formed of slats or bars D, which are so arranged as to pass through the spaces between the side bars C, and which are connected at one end upon the outer side of the trap by a cross-bar, and at their other end, within the trap, by another cross-bar, so that the trap may be opened by sliding out the said end D. The lower end of the inner cross-bar of the end D projects and enters a groove in the bottom of the trap, so as to keep the said end in position while being slid out and in. Some of the bars D are made wider, or are so arranged as to enter notches in the edges of the bars C to keep the said end in an erect position; and some of the bars D may project so as to enter notches in the edges of the bars C to firmly support the said end, when pushed in or closed. The forward end of the trap is formed of the spaying-table E, the inner lever F, and the outer lever G. The table E is hinged at one end to the base-bar of the frame A, so that it may be turned down within the trap when required for use. The free end of the table E is secured in place, when raised into a vertical position, by a pin, H, passed down through a hole in the top cross-bar of the front end frame A. The table E, near its free end, is provided with a hinged or drop-leg, I, which, when extended, supports the said table in an inclined position, as shown in Fig. 4. The table E is also provided with a series of inclined holes to receive hook-pins J, to confine the hind legs of the hog when laid upon the said table. The lower end of the lever F is pivoted to the base-bars of the frame A in such a position that, when erect, it may overlap the inner part of the table E. The upper end of the lever F is secured, when raised into an erect position, by a pin, K, which passes through a hole in said upper end and into a hole in the top bar of the frame A. The lever G is made of such a width as to cover the space between the lever F and the post of the frame A. The upper end of the lever G, at its inner edge, is hinged to the adjacent edge of the upper end of the lever F by a strap or hinge, so that the lower end of the said lever G may be swung out edgewise, as shown in Fig. 1. The upper ends of the levers F G are supported against outward pressure by a bent bar or keeper, L, attached to the top cross-bar of the frame A, and between which and said cross-bar the said levers pass, as shown in Figs. 1 and 3. The lower end of the lever F is supported against outward pressure by its pivoting-bolt. The lower end of the lever G is supported against outward pressure by the bar M, the inner end of which is pivoted to the bolt that pivots the lower end of the lever F. The outer end of the bar M is supported against outward pressure when the levers F G are in an erect position by the open or hook-keeper N, attached to the base-bar of the frame A near its end. The lower end of the lever G is moved outward and inward by the lever O, the lower end of which is pivoted to the bar M near its outer end, and the middle part of which is pivoted to a bracket, P, attached to the said lever G near its inner edge. Q is a lever-pawl pivoted to the lower part of the lever G, and the engaging end of which takes hold of the teeth of the ratchet-bar R attached to the bar M. S is an open keeper or hook attached to the base-bar of the frame A, to support the lever F when turned down into the position shown in Fig. 2. T is a hook or open keeper attached to the inner side of the lever G in such a position that when the said lever G is turned down, as shown in Fig. 2, it may enter a groove, U, formed in the inner side of the post of the frame A, as shown in dotted lines in Figs. 1, 2, and 3, and support said lever G against outward pressure.

In using the trap the end D is opened and the hog is driven into the trap. The lower end of the lever G is moved outward to open a space large enough for the passage of the hog's head. As the hog attempts to escape the lower end of the lever G is moved inward, clasping the hog's neck and holding him securely, the pawl Q locking said lever in place. The hog can now be conveniently ringed, marked, and castrated. When the hog is to be spayed the table E is turned down so that its free end may rest upon the floor of the trap, and the levers F G are turned down into the position shown in Fig. 2. This throws the hog upon her side upon the table E, and her hind legs are secured by the hook-pins J. The free end of the table E is then raised and supported by the hinged leg I. This raises the hind end of the hog and causes her intestines to fall forward, so as to be out of the way of the operator.

Having thus described our invention, we claim as new and desire to secure by Letters Patent—

1. The combination of the levers F and G, tilting lever O, and bar M, the latter pivoted to the frame A, substantially as shown and described, for the purpose specified.

2. The combination of the hinged table E, provided with the hinged or drop leg I, and holes for the hook-pins J, with the levers F G O, pivoted bar M, pawl-and-ratchet bar Q R, and keepers and pin L N H, and with the frame-work of the trap, substantially as herein shown and described.

JAMES M. OVERSHINER.
GEORGE M. OVERSHINER.

Witnesses:
GEO. M. BALLARD,
D. H. HECK.